United States Patent 3,422,183
Patented Jan. 14, 1969

3,422,183
ULTRA-VIOLET IRRADIATED SILVER FLUORIDE COMPOSITIONS AND BIOCIDE USES THEREOF
Hal J. Ellison, Chicago, Ill., assignor to Silaco Chemical Company, Chicago, Ill., a corporation of Illinois
No Drawing. Original application Mar. 22, 1961, Ser. No. 97,429, now Patent No. 3,230,137, dated Jan. 18, 1966. Divided and this application Dec. 27, 1965, Ser. No. 517,190
U.S. Cl. 424—28  11 Claims
Int. Cl. A61k 27/02; A61k 27/06; A01n 11/00

ABSTRACT OF THE DISCLOSURE

Biocide compositions comprising ultra-violet irradiated silver fluoride solutions containing colloidal silver resulting from the irradiation and kept in dispension by a protective colloid, e.g., casein or gelatin, and biocide uses thereof in slime control, against pathogens or other microbes in food or beverage containers or processing equipment, as an ingredient of wood preservatives, as a bactericide in paints, as a biocide in synthetic polymer films, as a sterilant in bandages, and biocide-like uses in other areas.

---

This application is a division of my application Ser. No. 97,429, filed Mar. 22, 1961, now U.S. Patent No. 3,230,-137.

This invention, in general, relates to biocide compositions utilizing as a biocide ultra-violet-irradiated silver fluoride compositions and to uses of ultra-violet-irradiated silver fluoride in the control of or destruction of many kinds of microorganisms.

There are many kinds of microorganisms, some of which are pathogens and cause illnesses or malfunctioning in humans, as well as animals, others of which attack or are detrimental to vegetation, still others of which create problems in many industrial processes, and others of which form molds, spores, growths or the like undesirable effects on many types of surfaces. This invention has as its primary objective the provision of biocide compositions which are toxic toward many types of microorganisms. Another object is to provide biocides which are toxic to microorganisms at dosage levels below the toxic level for humans. Still another object of the invention is to provide improvements in industrial processes and products of many diverse types through the utilization of ultra-violet-irradiated silver fluoride compositions as biocides.

Specific uses of the ultra-violet-irradiated silver fluoride biocides of this invention are as a slimicide in the control of microorganism-caused slime in aqueous mediums such as paper stock, paperboard stock, etc.; as a biocide for pathogens and other microbes in food or beverage containers or packages and food or drink processing equipment; as a bactericide in oil-base or water-base paints; as an ingredient of wood preservatives; as a biocide in films and other shaped articles made from synthetic resins such as polyethylene, polyvinyl chloride, polyacylic acid, polymethacrylic acid lower alkanol esters of said polymer acids, cellulosic polymers such as regenerated viscose, regenerated cuprammonium cellulose, cellulose esters, e.g., methyl cellulose or ethyl cellulose, cellulose ethers, polyvinylidene chloride, polystyrene, polyacrylamide, polyacrylonitrile, etc., as well as copolymers of the vinyl monomers of the aforesaid polyvinyl-type polymers; as a sterilant for bandages of various types, and in other areas which will be suggested to the skilled artisan by this disclosure.

One of the aspects of the invention is a new biocide composition which contains, as an active biocide, ultraviolet-irradiated silver fluoride. Ultra-violet-irradiated silver fluoride is very effective at low dosages in destroying a broad range of microbes. The ultra-violet-irradiation of the silver fluoride has been found to significantly increase its microbe killing power as compared with ultra-violet unirradiated silver fluoride, although the latter also may be an effective biocide. Generally speaking, however, the non-irradiated silver fluoride must be used at higher dosages or concentrations to obtain an equivalent microbe kill on an equal time basis.

As an example, silver fluoride which is irradiated with concentrated ultra-violet light as hereinafter defined in an aqueous medium is 90% or better effective in 15 minutes at 4 p.p.m. concentration against common slime-causing microorganisms while the non-irradiated silver fluoride is only about 47% effective against the same organisms in the same time and at the same concentration. Against *Escherichia coli*, the ultra-violet irradiated silver fluoride composition gives about 94% kill in 15 minutes.

One convenient way to manufacture the ultra-violet-irradiated silver fluoride biocides of the invention is to irradiate a solution of silver fluoride with ultra-violet rays from ultra-violet lamps. The silver fluoride solutions are prepared at the desired concentration, optimally at about 1–10% by weight AgF, and irradiated with ultra-violet light at concentrated intensity and for a sufficient time to produce an irradiated solution having a killing power toward a microbe or class of microbes which is greater than the equivalent quantity of non-irradiated silver fluoride. As a general rule of thumb, the microbe killing power of silver fluoride is significantly enhanced by subjecting a silver fluoride aqueous solution to said concentrated ultra-violet irradiation with rays which are at least about 95% in the ultra-violet spectrum for at least about 6–7 minutes for each gallon of silver fluoride solution into which the ultra-violet rays penetrate. Longer periods of irradiation are not harmful. Where the ultra-violet intensity of the rays is substantially less than that stated above, longer periods of irradiation usually are required to obtain optimum biocide properties in the irradiated solution.

During irradiation, there usually is formed in the silver fluoride solution a small amount of insoluble substances believed to be, at least in part, colloidal silver. This insoluble material has microbe killing power and it, accordingly, is desirable to keep the insoluble material in solution. For this purpose, it is desirable to add to the silver fluoride solution a water-soluble or water-dispersible dispersant or protective colloid for the insolubles to keep them in suspension. Examples of said dispersants or protective colloids are casein, gelatin, carboxy methyl cellulose, methyl cellulose, amylopectin, pectates, water-soluble gums such as gum arabic, gum tragancanth, etc., and various alginates. They ordinarily are employed in the silver fluoride at concentrations in the range of about 0.5 to 5% by weight.

The following examples constitute some of the preferred embodiments of the generic invention herein disclosed.

EXAMPLE 1

A silver fluoride solution containing about 4.8% AgF by weight and about 1% by weight of casein is irradiated with rays consisting of 95+% ultra-violet rays penetrating each gallon of the solution for 6–7 minutes. The microbe killing power of the irradiated solution toward common slime-producing organisms at 1–4 p.p.m. concentration of the irradiated silver fluoride is about double that of an equivalent concentration of non-irradiated silver fluoride.

EXAMPLE 2

A silver fluoride solution containing about 4.8% AgF by weight and about 1% by weight of gelatin is irradiated with rays consisting of 95+% ultra-violet rays penetrating each gallon of the solution for 6–7 minutes. The microbe killing power is substantially the same as the irradiated solution of Example 1.

The above-described ultra-violet-irradiated solutions of silver fluoride have many biocidal uses. These solutions can be added to or proportioned into aqueous systems and therein diluted to provide the desired biocide concentration. The ultra-violet irradiated silver fluoride solutions can be used with effectiveness at concentration as low as about 0.5 p.p.m. AgF. The upper limit of concentration may be as desired, even up to 10 or 15% by weight as AgF, though these high concentrations are rarely needed.

Where a product is produced in a process in which the ultra-violet irradiated silver fluoride composition is added as a biocide and the product is to come in contact with foods, sores or cuts in the body, the mouth, ears, eyes, etc., the concentration of the silver fluoride in or on the surface of the product, especially the latter, should be at a low level. It has been found that in such instances a concentration of AgF not exceeding about 4 p.p.m. is safe, non-toxic level with respect to humans who ingest or come into contact with these products. This also applies to food or beverage processing equipment wherein the residual amount of the silver fluoride left after sterilization of the equipment should be very small. This can be accomplished by sterilizing the equipment with a silver fluoride solution of the invention at a concentration in the range of about 0.5 to 10 p.p.m., preferably not more than about 4 p.p.m.

As a germicide in paints or coating compositions of the oil base or water base types, the concentration of the silver fluoride may be relatively high, if desired. While low concentrations in the range of about 1–20 p.p.m. by weight of the liquid paint or coating are effective in controlling germ growth on the dry paint surface, the concentration of the silver fluoride in the liquid paint can be much higher for special paints which are used in applications where a substantially completely microbe-free surface is important. In such cases, the concentration of the ultra-violet irradiated silver fluoride composition may be as high as about 2.0%. The aqueous biocide compositions may be incorporated into oil base paints by emulsifying the aqueous solutions in the oil base during or after the formulation of the paint by techniques known in the paint industry.

The ultra-violet irradiated silver fluoride biocide compositions of the invention may also be used in plastics of the aforementioned type to control or eliminate microbe growth on the surfaces of the plastic articles. It ordinarily is used in amounts in the range of about 0.1 to 1% by weight of the plastic when incorporated in the plastic, fused mass prior to formation of the plastic article. In some cases, it can be sprayed on the surface of the plastic article as a solution of the ultra-violet-irradiated silver fluoride composition.

In the sterilization of bandages, the aqueous sterilant solutions in which the bandage material is soaked or which is sprayed or otherwise applied to the bandage material preferably is one having a silver fluoride concentration of about 0.5 to 4 p.p.m. by weight. At this level, the quantity of the ultra-violet irradiated silver fluoride composition is kept within the range which is safe for humans.

The ultra-violet irradiated silver fluoride compositions of the invention may be used as wood preservatives in place of or in combination with known preservatives such as the mercurials or polyhalogenated phenols, which include polychlorinated phenols such as pentachlorophenol. In these instances, the concentration of the silver fluoride in the liquid wood preservative may range from low values, e.g., about 0.5% by weight of the liquid preservative, up to high levels in the range of 10–15% by weight. In addition to being effective against microorganisms, the silver fluoride in the wood preservatives is also toxic toward macroorganisms such as termites and other wood-boring species. The wood may be impregnated with the preservative in the form of an aqueous solution of the silver fluoride or in the form of a water-in-oil emulsion wherein the dispersed phase is the aqueous solution of irradiated silver fluoride composition and the continuous phase is toluene, xylene, naphthenes, or other liquid hydrocarbon.

In slime control in aqueous systems, such as paper stock, water-cooling towers, stagnant water ponds or pools, the concentration of the silver fluoride in the ultraviolet irradiated compositions is maintained at about 0.5 p.p.m. up to as high as about 50–100 p.p.m. by weight, depending on the aqueous system and the severity of the slime problem. Where the system serves as a source of drinking water for humans or animals, low concentrations are essential, i.e., above 0.5–4 p.p.m. Where the aqueous system is an aqueous fibrous stock such as paper stock or paperboard stock, again the maximum concentration of silver fluoride depends on ultimate use of the paper, paperboard or other fibrous product. Where the fibrous product comes into direct contact with food or beverage, the optimum concentration is about 0.5 to 4 p.p.m. AgF by weight of the aqueous stock. With other types of paper, the AgF may be as high as 100 p.p.m. by weight, again based on the aqueous stock.

Another way of applying the silver fluoride to fibrous products such as paper is by spraying the silver fluoride solution on the fibrous product to provide the desired quantity of silver fluoride in the produced paper.

The following are examples of applications of the biocides disclosed generically herein.

EXAMPLE 3

Food wrapping paper is produced by a conventional paper producing process on a Fourdrinier machine, and to the aqueous paper pulp stock is added the composition of Example 1 to provide a concentration of silver fluoride of 3 p.p.m., based on the weight of the paper stock. Slime is effectively controlled. The concentration of the ultraviolet irradiated AgF composition, as AgF, in the aqueous stock is carefully controlled so that it does not exceed 0.024 pound per ton of produced paper—thereby assuring a paper product which safely can be in direct contact with food to be eaten by humans.

EXAMPLE 4

Paperboard designated to be used in the production of a food or beverage package, wherein the food or beverage is to be in direct contact with the paperboard, is produced on a cylinder paper-making machine, and to the aqueous paperboard wood pulp stock is added the composition of Example 1 in an amount sufficient to provide an ultraviolet irradiated silver fluoride composition of 2 p.p.m., based on the weight of the paperboard stock. Slime-producing microorganisms are controlled effectively by the biocide. The concentration of the irradiated AgF composition, as AgF, in the aqueous stock is carefully controlled so that it does not exceed 0.024 pound per ton of produced paper—thereby assuring a paper product which safely can be in direct contact with food to be eaten by humans.

Where the paper or paperboard is not one which will be in direct contact with foods or beverages, concentrations of the silver fluoride greater than the 0.024 pound per ton of produced paper may be employed. In most cases, however, it is not necessary to exceed this value for effective slime control in the pulp stocks.

EXAMPLE 5

A water base paint, e.g., casein paint or an emulsion type paint such as an acrylic emulsion (Roplex AC–33), a commercial styrene-butadiene latex paint, a polyvinyl acetate latex paint, or the like, has dissolved in the aqueous phase 1% by weight, based on the solids in the paint composition, of ultra-violet-irradiated silver fluoride composition, which is irradiated in a manner similar to Example 1.

EXAMPLE 6

Wood is impregnated with the composition of Example 1 to provide a concentration of the irradiated solids, as AgF, of about 1%, based on the dry wood solids, when the impregnated wood is dry.

EXAMPLE 7

Gauze used in the manufacture of bandage products is soaked in a solution of 3-4 p.p.m. of irradiated silver fluoride prepared by diluting with sterile water the composition of Example 1. The gauze is then steamed and dried in sterile equipment to produce sterilized bandage.

EXAMPLE 8

The pasteurizing vats used to pasteurize beer are cleaned and then sterilized with a solution diluted with water to 2 p.p.m., as AgF, of the irradiated silver fluoride composition of Example 1.

It will be seen from the foregoing description and examples that the ultra-violet irradiated silver fluoride biocide composition has a broad range of microbe killing power and a broad range of uses in industry. Among the general classes of microbes against which these biocides are effective are the spore-forming bacteria, the non-spore-forming bacteria, yeasts, and molds. These biocides are effective against the coli bacteria family of which coliform is a member, against *Aerobacter aerogenes*, against *Aspergillus niger*, against *Penicillium expanceum*, and many others.

It will be seen from the foregoing description that this invention provides novel features, advantages, and characteristics applicable in a wide variety of ultimate uses and accomplishes its intended objectives, including those hereinbefore specified and others which are inherent in the invention.

The invention is hereby claimed as follows:

1. A biocide composition comprising an aqueous solution of silver fluoride in admixture with a small amount of colloidal silver, said admixture being produced by the irradiation of aqueous silver fluoride solution with concentrated ultra-violet light wherein the irradiation rays thereof are at least about 95% in the ultra-violet spectrum for a period of at least about six minutes per gallon of the ultra-violet irradiated, aqueous silver fluoride solution to produce said colloidal silver in situ in the aqueous silver fluoride solution in an amount sufficient to significantly increase the microbe killing power of said concentrated ultra-violet light irradiated silver fluoride solution compared against an equivalent concentration of non-irradiated silver fluoride solution on an equal time basis.

2. The composition of claim 1 wherein the solution contains a protective colloid in sufficient amount to keep the colloidal silver dispersed in the solution.

3. The composition of claim 1 wherein the protective colloid is casein.

4. The composition of claim 1 wherein the protective colloid is gelatin.

5. Wood impregnated with a biocidal quantity of a composition as claimed in claim 1 and thereafter dried.

6. A bandage material impregnated with a composition as claimed in claim 1 at a silver fluoride concentration of about 0.5-4 p.p.m. by weight and thereafter dried.

7. A biocide composition as claimed in claim 1, wherein the increase in microbe killing power of said concentrated ultra-violet light irradiated silver fluoride solution is about double that of said equivalent concentration of said non-irradiated silver fluoride solution.

8. A biocide composition as claimed in claim 1, wherein the concentration of the silver fluoride in the aqueous solution at the time of said concentrated ultra-violet irradiation is about 1-10% by weight.

9. A process for killing microorganisms which comprises bringing into contact with said microorganisms a biocidal amount of silver fluoride in admixture with a small amount of colloidal silver, said admixture being produced by the irradiation of aqueous silver fluoride solution with concentrated ultra-violet light wherein the irradiation rays thereof are at least about 95% in the ultra-violet spectrum for a period of at least about six minutes per gallon of the ultra-violet irradiated, aqueous silver fluoride solution to produce said colloidal silver in situ in the aqueous silver fluoride solution in an amount sufficient to significantly increase the microbe killing power of said concentrated ultra-violet light irradiated silver fluoride solution compared against an equivalent concentration of non-irradiated silver fluoride solution on an equal time basis.

10. A process as claimed in claim 9, wherein the concentration of the silver fluoride in the aqueous solution at the time of said concentrated ultra-violet irradiation is about 1-10% by weight.

11. A process as claimed in claim 9, wherein the increase in microbe killing power of said concentrated ultra-violet light irradiated silver fluoride solution is about double that of said equivalent concentration of said non-irradiated silver fluoride solution.

References Cited

UNITED STATES PATENTS

| | | | |
|---|---|---|---|
| 2,643,957 | 6/1953 | Lindgren | 117—147 |
| 2,853,449 | 9/1958 | Moundry | 167—14 |
| 2,902,400 | 9/1959 | Moundry | 167—14 |
| 2,922,737 | 1/1960 | Moundry | 167—14 |
| 2,927,052 | 3/1960 | Moundry | 167—14 |
| 2,563,593 | 8/1951 | Engel | 167—84 |
| 2,809,149 | 10/1957 | Consumano | 167—84 |

ALBERT T. MEYERS, *Primary Examiner.*

S. FRIEDMAN, *Assistant Examiner.*

U.S. Cl. X.R.

424—27, 29, 78, 81, 132; 210—58, 62, 64; 162—161; 106—15; 117—147; 260—29.6, 29.7, 45.75